United States Patent Office 3,259,520
Patented July 5, 1966

3,259,520
ANTISTATIC COMPOSITIONS DERIVED FROM POLYPHENYLENE OXIDES
Willem F. H. Borman, Dalton, Mass., assignor to General Electric Company, a corporation of New York
No Drawing. Filed Oct. 9, 1963, Ser. No. 314,856
14 Claims. (Cl. 117—138.8)

This invention relates to antistatic compositions derived from polyphenylene oxides or ethers; more particularly, the invention relates to antistatic combinations consisting of a substrate of high electrical resistivity and an ionic derivative of polyphenylene oxide.

The buildup of high electrostatic charges on surfaces with high surface resistivity, e.g. $10^{10}$ ohms per square or more, can have many undesirable effects. Contact with synthetic materials in automobile seat covers, floor rugs, clothing, etc., may create a high static charge on a person which, when subsequently discharged by contact with a grounded object, may cause an inpleasant sensation of shock. The accompanying spark, however small, creates a serious hazard in explosive atmospheres such as occur in hospital operating rooms.

The handling of synthetic fibers and films is often complicated by the formation of high electrostatic charges which cause the materials to behave in an erratic manner as by clinging to surrounding surfaces, collecting dust and lint, etc. A special case of this is encountered in high speed operations involving photographic film or magnetic tape where the electric charges may seriously interfere with reeling and unreeling of the film or tape. In addition, sparking caused by the discharge of high electrostatic charges may seriously and permanently damage photographic film. Where highly transparent synthetic materials are used as windows, their usefulness is often diminished by the rapid attraction of dust by the high electrostatic charges on the surface.

One of the solutions to the problem of electrostatic charge buildup has been to coat the charge-prone material with a thin surface layer of a material of sufficient electrical conductivity to serve as a discharge path to drain off electrostatic charges before they have a chance to accumulate. The present invention is directed to a new and improved material suitable for surface coating applications. Accordingly, this invention has as one of its objects the preparation of an antistatic composition offering high temperature stability and resistance to washing.

Another object of the invention is to provide an antistatic composition which will retain its electrical conductivity after storage at low humidity.

A further object of the invention is to provide an antistatic composition which undergoes only a very slight change in conductivity over a wide range of relative humidity.

Other objects of the invention will become apparent from the following specification and claims. Briefly stated, in accordance with one of its aspects, the invention is directed to an antistatic combination comprising a substrate of high electrical resistivity in contact with an ionic derivative of a polyphenylene ether consisting of repeating structural units of the formula:

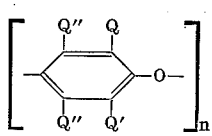

wherein the oxygen atom of one unit is connected to the benzene nucleus of the adjoining unit, $n$ is a positive integer and is at leaest 100, Q is a monovalent substituent selected from the group consisting of hydrogen, aliphatic hydrocarbon radicals free of a tertiary α-carbon atom, and aliphatic halohydrocarbon radicals free of a tertiary α-carbon atom; and Q' and Q'' are both monovalent substituents which are the same as Q and in addition, halogen, arylhydrocarbon radicals, haloarylhydrocarbon radicals, hydrocarbonoxy radicals having at least two carbon atoms and being free of an aliphatic, tertiary α-carbon atom, and halohydrocarbonoxy radicals having at least two carbon atoms and being free of an aliphatic, tertiary α-carbon atom.

The basic antistatic composition of the present invention is an ionic derivative of a polyphenylene oxide or ether as disclosed in copending Hay application Serial No. 212,128, filed July 24, 1962, which is assigned to the same assignee as the present application.

These polyphenylene ethers are produced by reacting oxygen in the presence of an amine and a cuprous salt soluble in the amine and capable of existing in the cupric state, with a phenol having the structural formula:

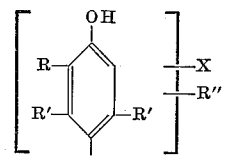

where X is a substituent selected from the group consisting of hydrogen, chlorine, bromine and iodine; R is a monovalent substituent selected from the group consisting of hydrogen, hydrocarbon radicals, and halohydrocarbon radicals having at least two carbon atoms, hydrocarbonoxy radicals and halohydrocarbonoxy radicals having at least two carbon atoms; R' and R'' are the same as R and in addition halogen. The polyphenylene ethers described above possess such interesting properties as high heat stability, high tensile strength, and excellent electrical properties. Of particular interest is the polymer derived from 2,6-dimethylphenol. Another interesting polymer is that derived from 2-methyl-6-ethylphenol. The polymer derived from o-cresol is also of interest.

Ionic derivatives of polyphenylene oxides or ethers may be prepared in a number of ways as set forth in copending Fox and Shenian application S.N. 155,825, copending Borman application S.N. 155,826, Pat. No. 3,226,361 or copending Hay applications S.N. 155,827, 155,828, and 155,829, all of which were filed November 29, 1961. The Fox and Shenian and Borman applications disclose ionic derivatives of polyphenylene oxides and ethers achieved through nuclear substitution of such groups as $SO_3H$, nitro, amino, diazonium, nitrile, carboxyl, quaternary ammonium, $PX_2$, $AsX_2$, in which X is halogen, $PO_3H_2$, $PO_2H_2$, $AsO_3H_2$, and $AsO_2H_2$. The Fox and Shenian application discloses the preparation of an aryl sulfonic derivative of polyphenylene oxide by reacting polyphenylene oxide either with chlorosulfonic acid or $SO_3$ (sulfan). Application S.N. 155,826 discloses the production of aryl substituted polyphenylene oxides by a series of steps beginning with nitration as by nitric acid to produce a nitrated polymer, reducing the nitrated polymer to produce nitroso, hydroxylamino or amino groups. The resulting polymers may be used as is or may be subjected to further chemical change. For example, the hydrogen atoms of the amino group may be replaced by one or two alkyl groups to produce a polymer having weak anion exchange properties. Exhaustive alkylation yields the quaternary compound which has stronger ion exchange characteristics.

Amino substituted polyphenylene oxides or ethers may also be obtained by amination of polyphenylene oxides containing chlorine, bromine, or iodine attached to the aromatic nucleus.

The amino compounds can be diazotized to yield diazonium salts and the diazonium groups may be replaced with other functional groups, such as halogens, CN, CNO, CNS, $PCl_2$, $AsCl_2$, etc., which in turn can be converted to other groups such as, CN to COOH, CN to $CH_2NH_2$; $PCl_2$ to $PO_2H_2$ and $PO_3H_2$; $AsCl_2$ to $AsO_2H_2$ and $AsO_3H_2$.

Hay application S.N. 155,827 discloses the preparation of halomethyl derivatives of polyphenylene oxide by reaction with a free halogen or a halogenating agent such as sulfuryl chloride, sulfuryl bromide, bromosuccinimide, etc. The halomethyl groups on the polyphenylene oxides are very reactive. Hay application S.N. 155,828 discloses the reaction of halomethyl polymers with alkali metal salts whereby the halogen group is replaced by the anion of the salt. Cation exchange resins can be prepared by reacting the halomethyl polymer with such compounds as alkali metal cyanides, alkali metal malonic esters, or with alkali metal mercaptans to give precursors of acidic groups. For example, the nitrile group can be hydrolized directly to a carboxyl group; the malonic ester substituent can be hydrolized to the corresponding malonic acid substituent which readily decarboxylates to give an acidic substituent; and the mercapto group can be oxidized to a sulfonic acid.

Reaction of the halomethyl polymer with trialkyl phosphite followed by hydrolysis leads to the polymeric phosphonic acids.

Hay application S.N. 155,829 is directed to the conversion of halomethyl groups on polyphenylene oxides to basic groups such as amino, quaternary ammonium, ternary sulfonium or quaternary phosphonium groups.

The ionic derivatives of polyphenylene oxides described above serve as excellent antistatic agents in conjunction with a substrate of high electrical resistance which may be in the form of a film, a filament, or other surface. In addition to high temperature stability and resistance to washing, storage of material having a surface coating of the antistatic materials of this invention under low humidity conditions unexpectedly does not markedly affect the conductivity. Furthermore, there was only slight change in the conductivity over a wide range of relative humidity.

The antistatic ionic derivative is normally dissolved in a solvent and applied to the substrate material in this form as by dipping, painting, spraying, etc. The solution strength is usually within a range of one hundredth of one percent to twenty percent depending upon the type of surface to be coated and method of application. While the polymers are highly resistant to many solvents there are a number of solvent systems available. For instance, a mixture of tetrahydrofuran-methanol will dissolve up to 20% of the polymer. The range of tetrahydrofuran in this system is between 30% and 70% with a tetrahydrofuran content of 50% as optimum within the range. Inexpensive solvent systems which may be used are ketone-alcohol (ketones are short chain aliphatic ketones in a range of 30% to 70% with 50% optimum) and ketone-water (ketone range 50% to 80% with 60% optimum). The ionic polymers of this invention are generally not soluble in water but solutions of these polymers in water-compatible solvents are infinitely extendable with water. Thus, inexpensive solutions are available. The following example illustrates the practice of this invention:

A thin film of sulfonated poly-2,6-dimethyl-1,4-phenylene oxide was coated onto a polystyrene tensile bar by dipping the bar into a 1% alcoholic solution of the sulfonated resin, followed by drying. The surface of the coated styrene was found to have a resistivity of $5 \times 10^5$ ohms per square as compared to $2 \times 10^{12}$ ohms per square for the uncoated polystyrene. Samples of the coated and uncoated polystyrene were charged with static electricity (corona discharge) and it was found that the surface resistivity of the coated polystyrene was sufficiently low that all the charge had leaked off in less than 30 seconds, while the surface resistivity of the uncoated polystyrene is high enough to retain a charge up to 6 volts after 5 minutes.

The procedure of the above example was followed for a number of other substrate materials with the results illustrated in Table 1.

In the examples of Table 1 the samples coated with the ionic polymer were kept in the relative humidity atmosphere listed for 32 days. The uncoated samples were in the relative humidity atmosphere for 13 days. The results were somewhat variable due to the fact that the resistance varied with the thickness of the coating. In the tests as performed the coating thickness was not determined.

TABLE 1

| Example | Substrate | Ionic Derivative | Humidity Conditions | | | Uncoated Substrate 90% R.H. |
|---|---|---|---|---|---|---|
| | | | Dry | 90% R.H. | 50% R.H. | |
| 2 | Polypropylene | Sulfonated, poly-2,6-dimethyl-1,4-phenylene oxide (2.5 $SO_3H$ groups per 10 aryl units). | $1 \times 10^8$ | $4 \times 10^7$ | $3 \times 10^9$ | $1 \times 10^{15} >$ |
| 3 | Polycarbonate resin | do | $4 \times 10^7$ | $1 \times 10^7$ | $6 \times 10^9$ | $1 \times 10^{15} >$ |
| 4 | Polymethylmethacrylate | do | $2 \times 10^7$ | $4 \times 10^7$ | $8 \times 10^8$ | $1 \times 10^{15} >$ |
| 5 | Polystyrene | do | $8 \times 10^7$ | $3 \times 10^7$ | $1 \times 10^9$ | $1 \times 10^{15} >$ |
| 6 | Polyformaldehyde | do | Film Cut | $1 \times 10^9$ | $7 \times 10^5$ | $1 \times 10^{15} >$ |
| 7 | Polyphenylene Oxide | do | $1 \times 10^8$ | $2 \times 10^7$ | $1 \times 10^9$ | $1 \times 10^{15} >$ |
| 8 | Polyethylene Terephthalate | do | $1 \times 10^8$ | $2 \times 10^7$ | $1 \times 10^9$ | $1 \times 10^{15} >$ |
| 9 | Bond Paper | do | $1 \times 10^{11}$ | $1 \times 10^6$ | $1 \times 10^8$ | $5 \times 10^9$ (50% R.H.) |
| 10 | Polypropylene | Quaternary Ammoniated poly-2,6-dimethyl-1,4-phenylene oxide (3.0 N $Me_3+Cl-$ groups per 10 aryl units). | $1 \times 10^7$ | $1 \times 10^7$ | $5 \times 10^7$ | $1 \times 10^{15} >$ |
| 11 | Polycarbonate resin | do | $2 \times 10^7$ | $4 \times 10^6$ | $5 \times 10^7$ | $1 \times 10^{15} >$ |
| 12 | Polymethylmethacrylate | do | $2 \times 10^7$ | $6 \times 10^6$ | $4 \times 10^7$ | $1 \times 10^{15} >$ |
| 13 | Polystyrene | do | $2 \times 10^7$ | $6 \times 10^6$ | $4 \times 10^7$ | $1 \times 10^{15} >$ |
| 14 | Polyformaldehyde | do | $1 \times 10^7$ | $4 \times 10^6$ | $5 \times 10^7$ | $1 \times 10^{15} >$ |
| 15 | Polyphenylene Oxide | do | $2 \times 10^7$ | $5 \times 10^6$ | $2 \times 10^7$ | $1 \times 10^{15} >$ |
| 16 | Polyethylene Terephthalate | do | $2 \times 10^7$ | $7 \times 10^6$ | $2 \times 10^7$ | $1 \times 10^{15} >$ |
| 17 | Bond Paper | do | $1 \times 10^9$ | $1 \times 10^6$ | $2 \times 10^7$ | $5 \times 10^9$ (50% R.H.) |
| 18 | Polypropylene | Sodium phosphonated poly-2,6-dimethyl-1,4-phenylene oxide (5.7 $PO_3Na_2$ groups per 10 aryl units). | | | $4 \times 10^7$ | $1 \times 10^{15} >$ |

In order to obtain strong flexible films it is desirable that the molecular weight of the polymeric material be as high as possible. The degree of polymerization of the base polyphenylene oxides should be at least 100, and preferably between 150 and 600 for ease of application. One of the most readily available polyphenylene oxides, poly-(2,6-dimethylphenylene oxide), of a degree of polymerization of 1,000 could be modified with any of the ionic groups previously described herein and still be completely soluble and capable of providing satisfactory antistatic coatings.

The strongly cationic and anionic derivatives are preferred because they are the most active. These derivatives preferably contain 1 to 6 active ionic groups for each 10 aryl units in the polymer.

As previously pointed out, a great deal of work has been performed on poly-(2,6-dimethyl-1,4-phenylene oxide) because of its ready availability. However, it is obvious that the presence of methyl groups in the molecule is not essential if the ionic groups are substituted on the aromatic nucleus. Thus, the methyl group may be replaced by hydrogen, other alkyl groups, halogen atoms or other inert substituents without affecting the utility of the material.

In case of the side chain substituted materials, such as the quaternary ammonium resins and the sodium phosphonate resins, some alkyl side chains are required on the base polymer, but these may be other alkyl groups than methyl, and any number from 1 to 4 alkyl groups per monomer unit may be present in the molecule. Copolymers of phenol and various substituted phenols may be used as starting material for the introduction of ionic groups or copolymers consisting of chemically linked modified polyphenylene oxide polymer chains and polymer chains of a different chemical nature, such as polyesters, polyamides, polyethers, polyvinyls, polyurethanes, polycarbonates, etc. It is not essential that the alkyl groups be attached to the 2 or 6 positions since in the polymer molecule the 2, 3, 5, and 6 positions are equivalent so that any number from 1 to 4 alkyl groups in any combination of positions will be equally satisfactory.

In addition to the ionic groups introduced to provide the desired electrical conductivity, other ionic or nonionic groups may be introduced to modify the physical properties of the material or to promote better adhesion to the surface to be coated. For instance, the polymer may be halogenated or nitrated before or after introduction of the ionic substituents, or such substituents may be present in the monomer or comonomer used to prepare the polymer from which the antistatic material is ultimately derived. Thus, 3-nitro-2,6-dimethylphenol may be polymerized alone or together with other substituted phenols to yield a partially nitrated polymer which may then be further modified to yield antistatic materials.

An important feature of the present invention is the solubilities of ionic derivatives of polyphenylene oxides in low cost solvents. Mixed solvents of 10.0 to 11.0 solubility parameter and high hydrogen bonding coefficient are most effective in dissolving these ionic polymers. While low polymer concentrations dissolve most readily, in general the polymers are soluble at 5% and 10% levels and the more soluble polymers can be dissolved at 20% level. An excellent solvent is one-to-one acetone-water. Once dissolved in such a solvent the solution becomes infinitely extendable with water. Some of the polymers are soluble in such alcohols as ethanol, methanol, propanol, and butanol. Mixed solvents are particularly effective. Examples of such mixtures are methylethyl ketone-ethanol, methylethyl ketone-methanol, methylethyl ketone-isopropanol, and tetrahydrofuran-water. While the solvents are normally used in about a 50–50 mixture it is obvious that satisfactory results are achievable within wide ranges of composition.

At higher ion exchange capacities (over 4 ionic groups per 10 aryl units) the polymers become more water soluble. This is generally undesirable since it reduces resistance to washing. The solubility behavior depends on the concentration of ionic groups in the polymer.

The surface resistivity of the ionic polymers of this invention is directly related to the thickness of the polymer layer. Layers that were 1/10 of a mil in thickness had a surface resistivity of $10^7$ ohms per square. The same polymers with a 2 mil thickness had a surface resistivity of $10^5$ ohms per square.

The ionic polymers of this invention were tested for their antistatic characteristics on textiles and for their antisoiling characteristics on textiles and other surfaces.

The quaternary ammonium derivative showed definite antistatic effects on nylon and glass fibers in amounts as low as 0.01%. With amounts as high as 1%, the antistatic effects were evident even under extremely low humidity conditions. In use tests on women's nylon tricot slips where one-half was treated to 0.01% and the other was untreated, the antistatic effect persisted even after five wash cycles, and on separate tests after five dry-cleaning cycles. In some cases washing or dry-cleaning actually increased the conductivity of the antistatic agent.

Antisoiling was measured by use tests on women's blouses and on carpeting. There was detectably less soiling at the collars of the blouses as well as on the treated portions of the carpeting.

It is postulated that the electrical conductivity of polyphenylene oxides modified with ionic groups is caused by the ability of the ionic groups to dissociate into ions of opposite charge, at least one of which is relatively free to move through the polymer matrix and transport electricity. Thus, the electrical conductivity appears to depend on the degree of ionization and the nature of the counter ion released. This is exemplified below:

(1) $RSO_3H \rightarrow RSO_3^- + H^+$
(2) $RSO_3Na \rightarrow RSO_3^- + Na^+$
(3) $RPO_3H_2 \rightarrow RPO_3H^- + H^+$
(4) $RPO_3Na_2 \rightarrow RPO_3NA^- + Na^+$ R=polymer chain In the case of a sulfonic acid substituted polyphenylene oxide, the acid has a higher conductivity than the sodium salt. In both cases (Equation 1 and 2) ionization is virtually complete, but the sodium ion, because of its greater bulk, moves much slower through the polymer matrix than the smaller H+ ion. When a weaker acid group is substituted, such as a phosphonic acid, the sodium salt has the higher conductivity because of the high degree of ionization of the sodium salt as compared to the acid.

In addition, the modified polymers absorb a certain amount of moisture, depending on the relative humidity of the surrounding atmosphere and the nature of the ionic groups. This absorbed water further increases the mobility of the counter ion and contributes to the electrical conductivity of the materials.

A particular advantage over conventional antistatic agents possessed by the antistatic agents of this invention is their flexibility. They are not brittle and, therefore, do not embrittle the substrate as do other permanent antistatic agents.

While the invention has been described with reference to certain specific embodiments it is to be understod that there are many modifications which are obviously possible. Accordingly, the invention is properly limited in scope only as may be necessitated by the scope of the appended claims.

What I claim as new and desire to secure by Letters Patent of the United States is:

1. An antistatic combination comprising a substrate of high electrical resistivity in contact with an ionic derivative of a polyphenylene ether having a surface resistivity lower than that of the substrate and consisting of repeating structural units of the formula:

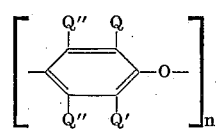

wherein the oxygen atom of one unit is connected to the benzene nucleus of the adjoining unit, n is a positive integer and is at least 100, Q is a monovalent substituent selected from the group consisting of hydrogen, aliphatic hydrocarbon radicals free of a tertiary α-carbon atom, and aliphatic halohydrocarbon radicals free of a tertiary α-carbon atom; and Q' and Q'' are both monovalent substituents which are the same as Q and in addition halogen, arylhydrocarbon radicals, haloarylhydrocarbon radicals, hydrocarbonoxy radicals having at least two carbon atoms and being free of an aliphatic, tertiary α-carbon atom, and halohydrocarbonoxy radicals having at least two carbon atoms and being free of an aliphatic, tertiary α-carbon atom; the ionic substituent being selected from the group consisting of nitro, amino, diazonium, nitrile, carboxyl, quaternary ammonium, $PX_2$, $-AsX_2$, in which X is a halogen, side chain substituted $-SO_3H$, $-PO_3H_2$, $-AsO_2H_2$, and $AsO_3H_2$.

2. The antistatic combination as claimed in claim 1 wherein the ironic derivative of the polyphenylene ether is water insoluble and has a maximum of four ionic groups per ten aryl units.

3. The antistatic combination as claimed in claim 1 wherein the substrate has a surface resistivity of at least $10^{10}$ ohms.

4. An antistatic combination as claimed in claim 3 wherein the ionic derivative of polypyhenylene ether is a nuclear substituted derivative.

5. An antistatic combination as claimed in claim 3 wherein part or all of the alkyl groups of the basic polymer are monohalogenated followed by reaction of the resulting products with a tertiary amine to form the quaternary ammonium salt.

6. An antistatic combination as claimed in claim 3 wherein part or all of the alkyl groups of the basic polymer are monohalogenated, reacting the resulting products with a trialkylphosphite, followed by hydrolysis of the phosphonic ester and neutralization of the resulting phosphonic acid.

7. An antistatic combination as claimed in claim 5 wherein the basic polymer is monochlorinated.

8. An antisatic combination as claimed in claim 5 wherein the tertiary amine is trimethylamine.

9. An antistatic combination as claimed in claim 6 wherein the trialkylphosphite is triethylphosphite, the hydrolysis is performed with aqueous hydrochloric acid and the resulting phosphonic acid is neutralized with sodium hydroxide.

10. A process for preventing build-up of an electrosatic charge on a substrate having a high surface resistivity which comprises contacting said substrate with an ionic derivative of a polyphenylene ether having a surface resistivity lower than that of the substrate and consisting of repeating structural units of the formula:

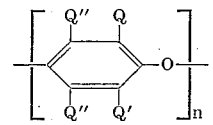

wherein the oxygen atom of one unit is connected to the benzene nucleus of the adjoining unit, n is a positive integer and is at least 100, Q is a monovalent substituent selected from the group consisting of hydrogen, aliphatic hydrocarbon radicals free of a tertiary alipha-carbon atom, and aliphatic halohydrocarbon radicals free of a tertiary alipha-carbon atom; and Q' and Q'' are both monovalent substituents which are the same as Q and in addition halogen, arylhydrocarbon radicals, haloarylhydrocarbon radicals, hydrocarbonoxy radicals having at least two carbon atoms and being free of a tertiary aliphatic alpha-carbon atom, and halohydrocarbon radicals having at least two carbon atoms and being free of an aliphatic, tertiary alpha-carbon atom; the ionic substituent being selected from the group consisting of nitro, amino, diazonium, nitrile, carboxyl, quaternary ammonium, $-PX_2$, $-AsX_2$, in which X is halogen, side chain substituted $-SO_3H$, $-PO_3H_2$, $-AsO_2H_2$, and $-AsO_3H_2$.

11. The process as claimed in claim 10 wherein the ionic derivative of the polyphenylene ether is a nuclear substituted derivative.

12. The process of claim 10 wherein the substrate has a surface resistivity of at least $10^{10}$ ohms.

13. The process as claimed in claim 12 wherein the ionic derivative of the polyphenylene ether is water insoluble and has a maximum of four ionic groups per ten aryl units.

14. The process of claim 13 wherein the ionic derivative is a quaternary ammonium derivative.

References Cited by the Examiner

UNITED STATES PATENTS 3,134,753   5/1964   Kwiatek _____ 260—47
3,137,576   6/1964   Himmelmann et al. ____ 260—47

OTHER REFERENCES

AD 266 452, Armed Services Technical Information Agency Arlington Hall Station, Arlington 12, Virginia, pp. 18–21, Nov. 22, 1961, copy in Group 140.

MURRAY TILLMAN, *Primary Examiner.*

J. C. BLEUTGE, *Assistant Examiner.*